(12) United States Patent
Sasahara et al.

(10) Patent No.: US 7,569,300 B2
(45) Date of Patent: Aug. 4, 2009

(54) FUEL CELL ASSEMBLY AND A SEPARATOR THEREFOR

(75) Inventors: Jun Sasahara, Kawagoe (JP);
Toshifumi Suzuki, Fuchu (JP);
Tadahiro Kubota, Asaka (JP); Nariaki Kuriyama, Fujimi (JP); Yuji Saito, Tokyo (JP)

(73) Assignee: Honda Motor Co., Ltd, Tokyo (JP)

( * ) Notice: Subject to any disclaimer, the term of this patent is extended or adjusted under 35 U.S.C. 154(b) by 810 days.

(21) Appl. No.: 10/986,322

(22) Filed: Nov. 4, 2004

(65) Prior Publication Data

US 2005/0181266 A1 Aug. 18, 2005
US 2009/0004546 A9 Jan. 1, 2009

Related U.S. Application Data

(63) Continuation of application No. PCT/JP03/05630, filed on May 2, 2003.

(60) Provisional application No. 60/379,524, filed on May 9, 2002.

(51) Int. Cl.
*H01M 2/18* (2006.01)
*H01M 8/04* (2006.01)

(52) U.S. Cl. .............................. 429/39; 429/38; 429/34

(58) Field of Classification Search .............. 429/20–40
See application file for complete search history.

(56) References Cited

U.S. PATENT DOCUMENTS

| | | | | |
|---|---|---|---|---|
| 4,510,212 A | * | 4/1985 | Fraioli | 429/30 |
| 4,548,876 A | * | 10/1985 | Bregoli | 429/39 |
| 5,367,764 A | | 11/1994 | DiStefano et al. | 29/830 |
| 5,631,099 A | | 5/1997 | Hockaday | 429/30 |
| 6,322,919 B1 | * | 11/2001 | Yang et al. | 429/34 |
| 2001/0028974 A1 | * | 10/2001 | Nakata et al. | 429/34 |
| 2002/0006539 A1 | * | 1/2002 | Kubota et al. | 429/44 |
| 2002/0012825 A1 | * | 1/2002 | Sasahara et al. | 429/30 |

FOREIGN PATENT DOCUMENTS

| | | | |
|---|---|---|---|
| EP | 1026768 | | 8/2000 |
| GB | 1 505 343 | | 3/1978 |
| GB | 1505343 | * | 3/1978 |
| JP | 9283157 | | 10/1997 |
| JP | 10302818 | | 11/1998 |
| JP | 2000173629 | | 6/2000 |
| WO | WO01/95406 | | 12/2001 |
| WO | WO 0243177 A2 | * | 5/2002 |
| WO | WO 03/096453 A2 | * | 11/2003 |

* cited by examiner

*Primary Examiner*—Dah-Wei D Yuan
*Assistant Examiner*—Edu E Enin-Okut
(74) *Attorney, Agent, or Firm*—Lument Patent Firm

(57) ABSTRACT

In a fuel cell assembly (1) comprising a pair of separators (11, 12) each for defining a recess (10) serving as a conduit for a fuel fluid or an oxidizer fluid, a feedthrough conductive path for connecting top and under surfaces of each separator is achieved by a second electroconductive film (36) formed on a side wall of a through-hole (33) extending through each separator (11, 12) in such a manner that the second electroconductive film (36) connects a first electroconductive film (35) constituting a top surface of a protrusion (30) provided in the recess (10) to a third electroconductive film (37) formed on a surface opposite to that formed with the recess (10).

10 Claims, 13 Drawing Sheets

US 7,569,300 B2

FUEL CELL ASSEMBLY AND A SEPARATOR THEREFOR

CROSS-REFERENCE TO RELATED APPLICATIONS

This application is a continuation of PCT International Application PCT/JP03/05630 filed on May 2, 2003, which claims priority from U.S. Provisional Application No. 60/379,524 filed on May 9, 2002.

TECHNICAL FIELD

The present invention relates to a fuel cell assembly and a separator therefor. Particularly, the present invention relates to a compact fuel cell assembly comprising a separator formed by using a semiconductor process or micromachine process such as etching, and a separator therefor.

BACKGROUND OF THE INVENTION

A fuel cell comprises an electrolyte layer and a pair of catalyst carrying electrodes placed on either side of the electrolyte layer, and generates electricity through an electrochemical reaction between fuel fluid such as hydrogen or alcohol and oxidizing fluid such as oxygen or air, which are supplied to the corresponding electrodes, with the aid of the catalyst. There are a number of different types of fuel cells that have been proposed. Many of them use liquid electrolytes, but those using solid electrolytes are being preferred more and more for the ease of fabrication and handling.

However, the voltage output produced from each of such solid electrolyte type fuel cells is very low, typically in the order of 1 volt or less, and most applications require substantially higher voltages. Therefore, it is necessary to connect individual fuel cells electrically in series. Typically, such series connection of fuel cells is achieved by stacking the fuel cells to form a fuel cell stack, but it has been also proposed to provide a fuel cell assembly in the form of a sheet in that a plurality of fuel cells are arranged in a common plane. (International Publication WO01/95406).

In this fuel cell assembly, a pair of separators (or flow distribution plates) interposing an electrolyte layer therebetween and defining passages for fuel gas (e.g., hydrogen) and oxidizing gas (e.g., oxygen) are each formed with a plurality of recesses, which serve as gas flow passages, corresponding to a plurality of fuel cells in a matrix pattern such that adjacent recesses are connected to different gas supply systems and thus adjacent fuel cells have opposite polarities. Each fuel cell can be connected to its adjacent fuel cell by an associated one of gas diffusion electrodes each formed of, e.g., a carbon sheet comprising a platinum (Pt) catalyst and disposed on either side of the electrolyte layer so as to face the gas flow passages (or the recesses of the separators) such that the fuel cells are connected in series as a whole. The gas diffusion electrodes are made of a porous material and thus tend to have a large electric resistance. For this reason, it has been also proposed to achieve the cell-to-cell connection by electroconductive films formed on a surface of each separator facing the electrolyte layer by vapor depositing gold, for example, to thereby reduce the electric resistance.

Component parts such as the separators for defining a plurality of fuel cells can be preferably manufactured by using a semiconductor process or micromachine process such as etching a substrate consisting of a single crystal silicon or glass. Particularly, the separators for use in a small fuel cell assembly comprising fuel cells having a power of about 1-100 W and used in place of a battery or the like require a high level of precision that can be hardly attained by machining, but it is possible to manufacture such separators with sufficiently high precision and high efficiency by using the semiconductor process or micromachine process.

Thus, according to the above proposition, a fuel cell assembly in the form of a sheet (or a planar fuel cell assembly) and having a plurality of interconnected fuel cells can be achieved. In such a fuel cell assembly, however, the gas diffusion electrodes or electroconductive films for connecting the cells are disposed between the electrolyte layer and each separator, and thus it is practically impossible to change the cell connection pattern once the fuel cell assembly has been assembled.

Even when a fuel cell assembly comprises only a single fuel cell, it may be sometimes desirable that an outer side of each separator is provided with an electrode for connection to external devices. For example, such a configuration can make it easier to stack a plurality of fuel cell assemblies and connect them in series to form a fuel cell stack. FIG. 14 shows an example of such a fuel cell assembly that allows an electrode to be provided on the outer side of each separator. This fuel cell assembly 100 comprises a pair of separators 111, 112 each made of silicon, for example, and formed with a recess 110 for defining a flow passage for a fuel fluid (e.g., hydrogen gas) or an oxidizing fluid (e.g., oxygen gas), an electrolyte layer 113 interposed between the pair of separators 111, 112, and a pair of diffusion electrodes 114 disposed on either side of the electrolyte layer 113 so as to face the recesses 110 of the separators 111, 112. Each diffusion electrode 114 comprises a catalyst electrode layer 115 contacting the electrolyte layer 113, and a diffusion layer 116 adjoining the recess 110 of the separators 111, 112. In this fuel cell assembly 100, the surface of each separator 111, 112 is coated with an electroconductive film 120 formed by vapor deposition, for example, so that an electric potential of each diffusion electrode 114 can be transmitted from an inner surface of each separator 111, 112 contacting the diffusion electrode 114 to an opposite outer surface of the same via the electroconductive film 120, thereby making it possible to provide the outer surface of the separators 111, 112 with an electrode 121 for connection to external devises. However, in such a fuel cell assembly 100, the electroconductive path implemented by the electroconductive film 120 tends to be long and result in an undesirably high internal resistance of the fuel cell assembly 100. Further, although it may be relatively easy to deposit the electroconductive film 120 evenly on the top and under surfaces of the separators 111, 112, it is difficult to deposit the electroconductive film 120 evenly on side surfaces of the separators 111, 112 which are perpendicular to the top or under surface. This can result in an undesirably thin electroconductive film 120 formed on the side surfaces and thus increase the internal resistance of the fuel cell assembly 100.

Japanese Patent Application Laid-Open (kokai) No. 2000-173629 has disclosed to set a plurality of metallic pin or a metallic plate having a plurality of protrusions in an insert molding die, and inject molten resin material therein to form an integrally molded separator such that the metallic pins or the metallic plate extends through the separator. In this way, electric potential of the electrode (anode or cathode) contacting the inner surface of the separator can be transmitted to the outer surface of the separator via the metallic pins or the metallic plate. Since the electroconductive path thus implemented extends through the separator instead of covering it, the electroconductive path can be shorter and result in a smaller internal resistance of the fuel cell assembly. However, such an approach cannot be applied to a separator formed by etching a substrate made of an inorganic material such as single crystal silicon, glass or the like.

BRIEF SUMMARY OF THE INVENTION

In view of such problems of the prior art, a primary object of the present invention is to provide a compact fuel cell assembly having a pair of separators formed by a semiconductor process or micromachine process such as etching and provided with one or more electroconductive paths extending therethrough.

A second object of the present invention is to provide a compact fuel cell assembly comprising a plurality of fuel cells arranged in a common plane and allows easy electrical connection among these cells.

A third object of the present invention is to provide a separator for a fuel cell assembly formed by a semiconductor process or micromachine process such as etching and provided with one or more electric paths extending therethrough.

According to one aspect of the present invention, such objects can be accomplished by providing a fuel cell assembly, comprising: an electrolyte layer (13); a pair of catalyst electrode layers (15) interposing the electrolyte layer therebetween; a pair of separators (11, 12) each having a first surface facing the electrolyte layer and a second surface opposite to the first surface, the first surface of each of the pair of separators being provided with a recess (10) through which a fuel fluid or an oxidizer fluid flows so as to contact an associated one of the pair of catalyst electrode layers; one or a plurality of through-holes (33) extending from the first surface to the second surface of each separator; a first electroconductive film (35) formed on at least part of the first surface of each separator so as to be electrically connected to an associated one of the pair of catalyst electrode layers in an assembled state of the fuel cell assembly; a second electroconductive film (36) formed on at least part of a side wall of the one or a plurality of through-holes of each separator so as to be electrically connected to the first electroconductive film; and a third electroconductive film (37) formed on at least part of the second surface of each separator so as to be electrically connected to the second electroconductive film. For the purpose of diffusing the fluid (typically gas) over the catalyst electrode layers to improve the reaction efficiency, the fuel cell assembly may preferably comprise an electroconductive diffusion layer (16) between each of the separators and the associated catalyst electrode layer. According to the above structure, the second electroconductive film formed on the side wall of the through-hole and connecting the first electroconductive film on the first surface of each separator to the third electroconductive film on the second surface of each separator functions as the electroconductive path extending through each separator.

Thus, even when the separators are formed by a semiconductor or micromachine process including a step of etching an inorganic substrate, the first to third electroconductive films can be readily formed by physical vapor deposition (PVD), chemical vapor deposition (CVD), spin coating, sputtering, screen printing or the like, which can make it possible to achieve a compact fuel cell assembly that comprises a pair of separators each having one or more electroconductive paths extending therethrough. By providing the electroconductive path extending through each separator, it is possible to provide an electrode on the outer surface of the separator without increasing the internal resistance of the fuel cell assembly.

Preferably, at least one protrusion (30, 55, 56) is provided in the recess of each of the pair of separators wherein the first electroconductive film constitutes at least part of a top surface of the protrusion. This can achieve favorable fluid flow in the recess while ensuring a sufficient contact area between the first electroconductive film and the catalyst electrode layer (or diffusion layer).

In the case where each separator is provided with a plurality of recesses so that a plurality of fuel cells (25a-25d) are arranged on a common plane, and a plurality of third electroconductive films corresponding to the plurality of fuel cells are formed on the second surface of each separator, the fuel cell assembly may further comprise one or more electrical connection members (26a-26i) for contacting the third electroconductive films on the second surface of the pair of separators to thereby electrically connect the plurality of fuel cells. In such a fuel cell assembly, the connection pattern of the fuel cells can be readily changed by changing the arrangement of the electrical connection members.

Preferably, the side wall of each through-hole of the pair of separators is inclined so that each through-hole diverges from the first surface to the second surface of the pair of separators. This can facilitate achieving the second electroconductive film having a uniform thickness when the second electroconductive film is formed on the side wall of each through-hole by vapor deposition, for example. Such a through-hole having an inclined side-wall can be formed by wet etching a silicon substrate (50), for example.

In one embodiment, the through-hole may be formed in the protrusion in the recess. In such a case, if the first electroconductive film constitutes at least part of the top surface of the protrusion, the connection between the first electroconductive film and the second electroconductive film can be readily achieved. In another embodiment, it is possible that the through-hole is provided in a bottom of the recess, and at least part of the first electroconductive film extends along the bottom of the recess to contact the second electroconductive film formed on the side wall of the through-hole provided in the bottom of the recess. This can eliminate a need for forming a through-hole in the protrusion, and thus the first electroconductive film on top of the protrusion can be substantially flat, which in turn favorably increases the area of the first electroconductive film contacting the catalyst electrode layer (or diffusion layer), to thereby reduce the internal resistance of the fuel cell assembly.

In the case that the substrate is made of a semiconductor material, in order to ensure a reliable insulation, an insulating layer (51, 52, 53) may be formed between the first electroconductive film and the first surface of each separator, between the second electroconductive film and the side wall of the through-hole, and between the third electroconductive film and the second surface of each separator.

According to another aspect of the present invention, there is provided a separator (11, 12) for a fuel cell assembly, comprising: a first surface; a second surface opposite to the first surface; a recess (10) formed in at least one of the first surface and the second surface for fuel fluid or oxidizer fluid to flow therethrough; one or a plurality of through-holes (33) extending from the first surface to the second surface of the separator; a first electroconductive film (35) formed on at least part of the first surface of the separator; a second electroconductive film (36) formed on at least part of a side wall of the through-hole and electrically connected to the first electroconductive film; and a third electroconductive film (37) formed on at least part of the second surface of the separator and electrically connected to the second electroconductive film. In this way, an electroconductive path extending through the separator can be implemented by the second electroconductive film formed on the side wall of the through-hole, and therefore, the electroconductive path extending through the separator can be readily formed even when the separator is formed by a semiconductor process or micromachine process including a step of etching an inorganic substrate.

Other and further objects, features and advantages of the invention will appear more fully from the following description.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
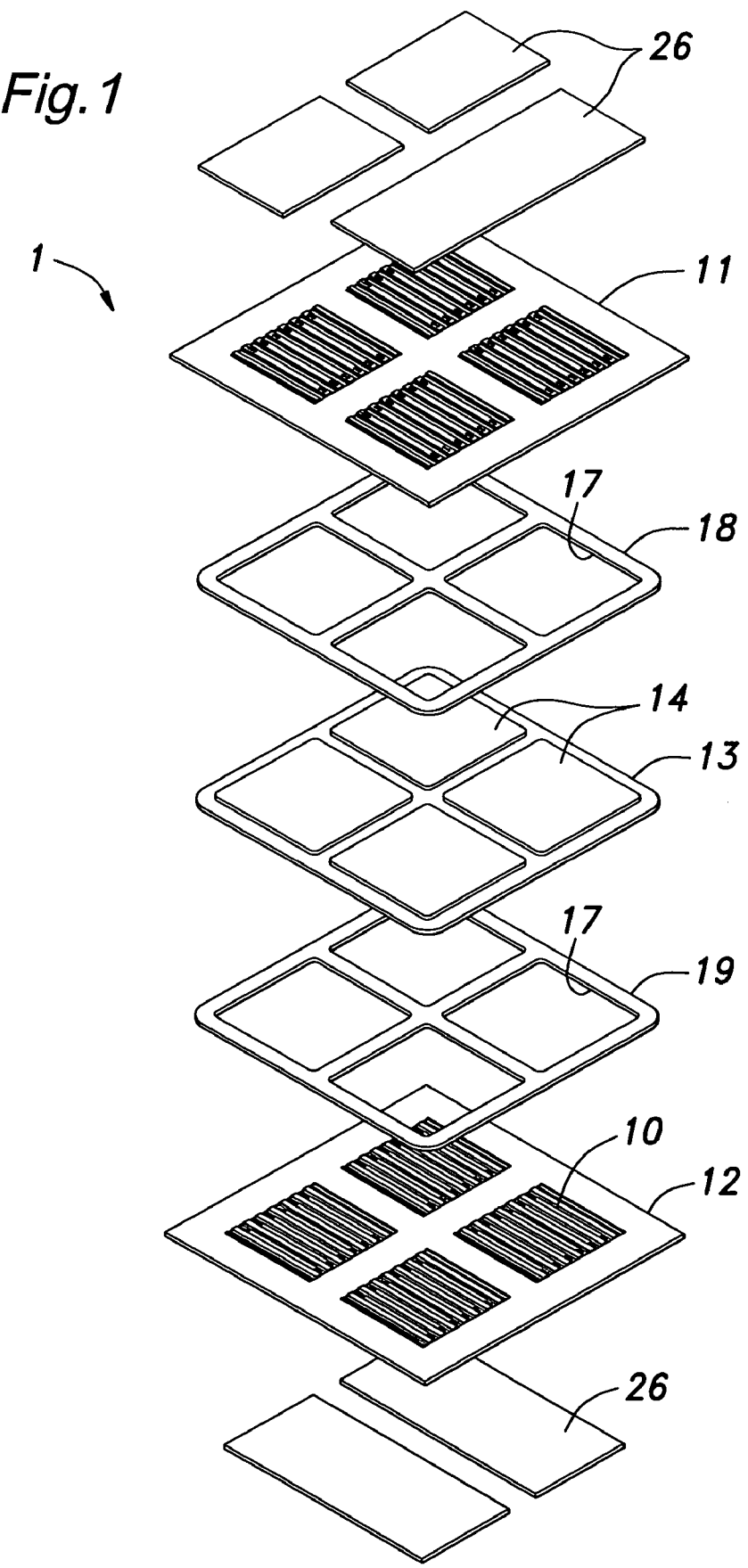
FIG. 1 is an exploded perspective view for showing a preferred embodiment of a fuel cell assembly according to the present invention.

FIG. 1 is an exploded perspective view showing a preferred embodiment of a fuel cell assembly according to the present invention. This fuel cell assembly 1 comprises a pair of separators 11, 12 each formed with a plurality (four in this embodiment) of substantially rectangular recesses 10 arranged in a matrix pattern and defining fluid passages for a fuel fluid (e.g., hydrogen gas) or an oxidizing fluid (e.g., oxygen gas), and an electrolyte layer 13 interposed between the pair of separators 11, 12 (the recesses 10 are formed in an under surface of the upper separator 11 in the drawing while the recesses 10 are formed in a top surface of the lower separator 12). The size of each recess can be 14 mm×14 mm, for example.

On either side of the electrolyte layer are provided a plurality of diffusion electrodes 14 each facing a corresponding one of the recesses 10. Each diffusion electrode 14 comprises a catalyst electrode layer 15 contacting the electrolyte layer 13, and a diffusion layer 16 adjoining the recess 10 of the separators 11, 12 (see FIG. 4). The catalyst electrode layer 15 typically comprises carbon that carries platinum as a catalyst, while the diffusion layer 16 can comprise an electroconductive porous material such as a carbon paper or a carbon cloth. The catalyst electrode layer 15 may be separate from the diffusion layer 16. As a case may be, the diffusion layer 16 can be omitted.

Further, seal plates 18, 19 are disposed between the electrolyte layer 13 and the separators 11, 12. Each seal plate 18, 19 has a substantially same thickness as the diffusion electrode 14 (e.g., 350 μm), and is provided with openings 17 formed at positions aligned with the recesses 10 of the separators 11, 12 and having a slightly larger size than the diffusion electrode 14 to thereby prevent the fluid supplied to the recesses 10 in an operating state from leaking through the interface between the electrolyte layer 13 and the separators 11, 12. The surface of each separator 11, 12 facing the electrolyte layer 13 may be referred to as a first surface (or inner surface) while the opposite surface may be referred to as a second surface (or outer surface).

The fuel cell assembly 1 is formed by placing the separator 11, seal plate 18, electrolyte layer 13, seal plate 19 and separator 12 one over another in this order with the diffusion electrodes 14 being placed in the corresponding openings 17 of the seal plates 18, 19, and bonding them integrally. In this embodiment, a recess 10 of one separator 11, opposing fluid passage 10 of the other separator 12, a pair of diffusion electrodes 14 disposed between the pair of opposing recess 10, and the electrolyte layer 13 forms an individual fuel cell, so that total of four fuel cells 25a-25d arranged in a plane are formed in the fuel cell assembly 1 (see FIG. 5a, for example). It should be noted that although the fuel cell assembly 1 comprises the single electrolyte layer 13 which is common to the four fuel cells 25a-25d, separate electrolyte layers 13 may be provided for respective fuel cells 25a-25d.

As is well known in the art, the electric polarity of each cell 25a-25d is determined by the fluids supplied to the recess 10. Specifically, the diffusion electrodes 14 contacting the fuel fluid such as hydrogen gas ($H_2$) constitute anodes while diffusion electrodes 14 contacting the oxidizing fluid such as oxygen gas ($O_2$) constitute cathodes. The hydrogen gas supplied as the fuel fluid can be produced by reforming alcohol, for example, and the air containing $O_2$ can serve as the oxidizing fluid. Also, as will be readily appreciated by a person having ordinary skill in the art, the fuel and oxidizing fluids may consist of liquid such as alcohol and hydrogen peroxide.

Further, the fuel cell assembly 1 comprises a plurality of electroconductive plates 26 attached to the outer surface (or the surface opposite to that formed with the fluid passages 10) of the separators 11, 12 so as to serve as electrical connection members for connecting the four fuel cells 25a-25d in a desired connection pattern such as series or parallel connections.

Figure 2:
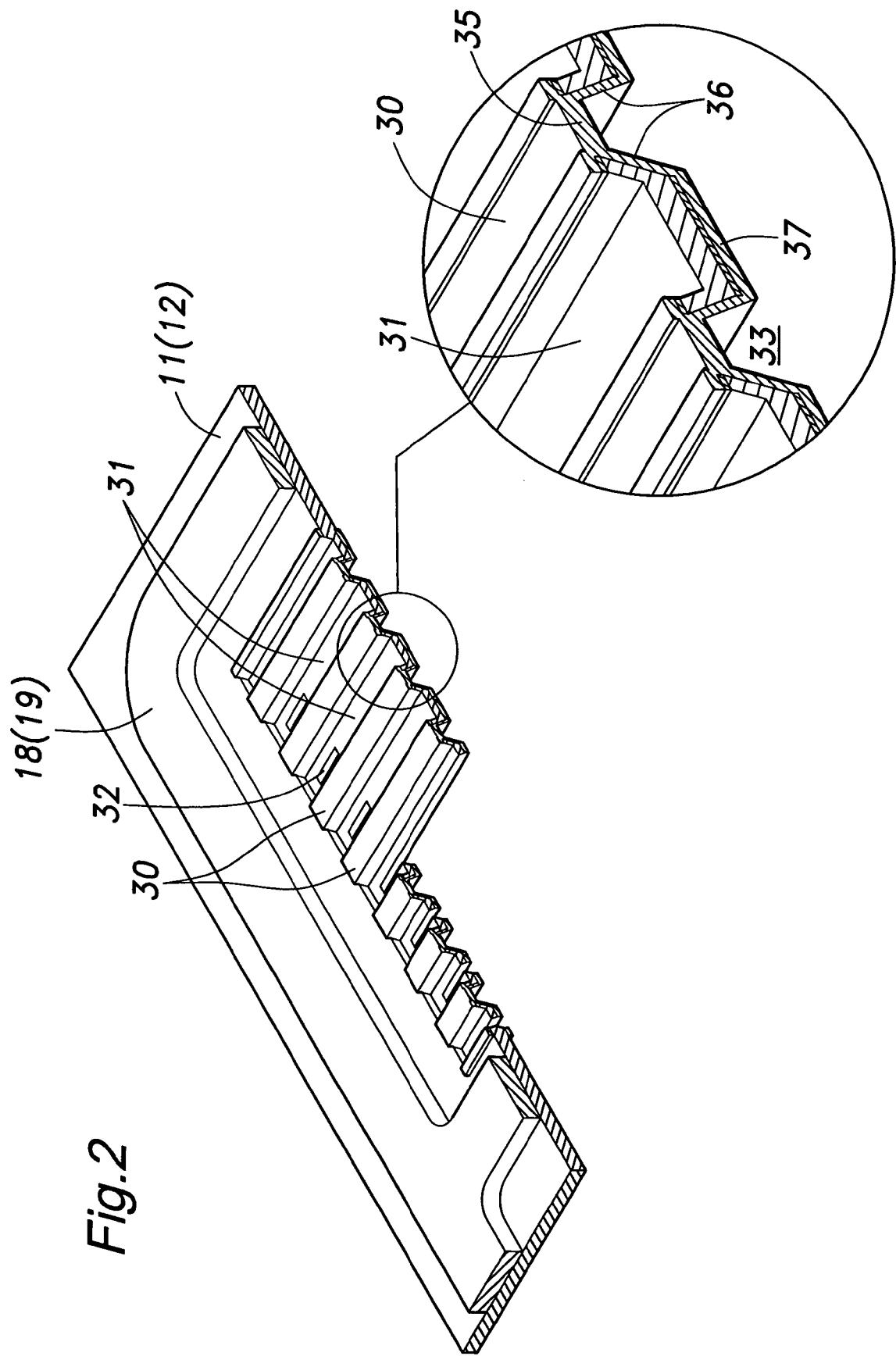
FIG. 2 is a partly broken, enlarged partial perspective view for showing the separator of FIG. 1 in detail.
Figure 3:
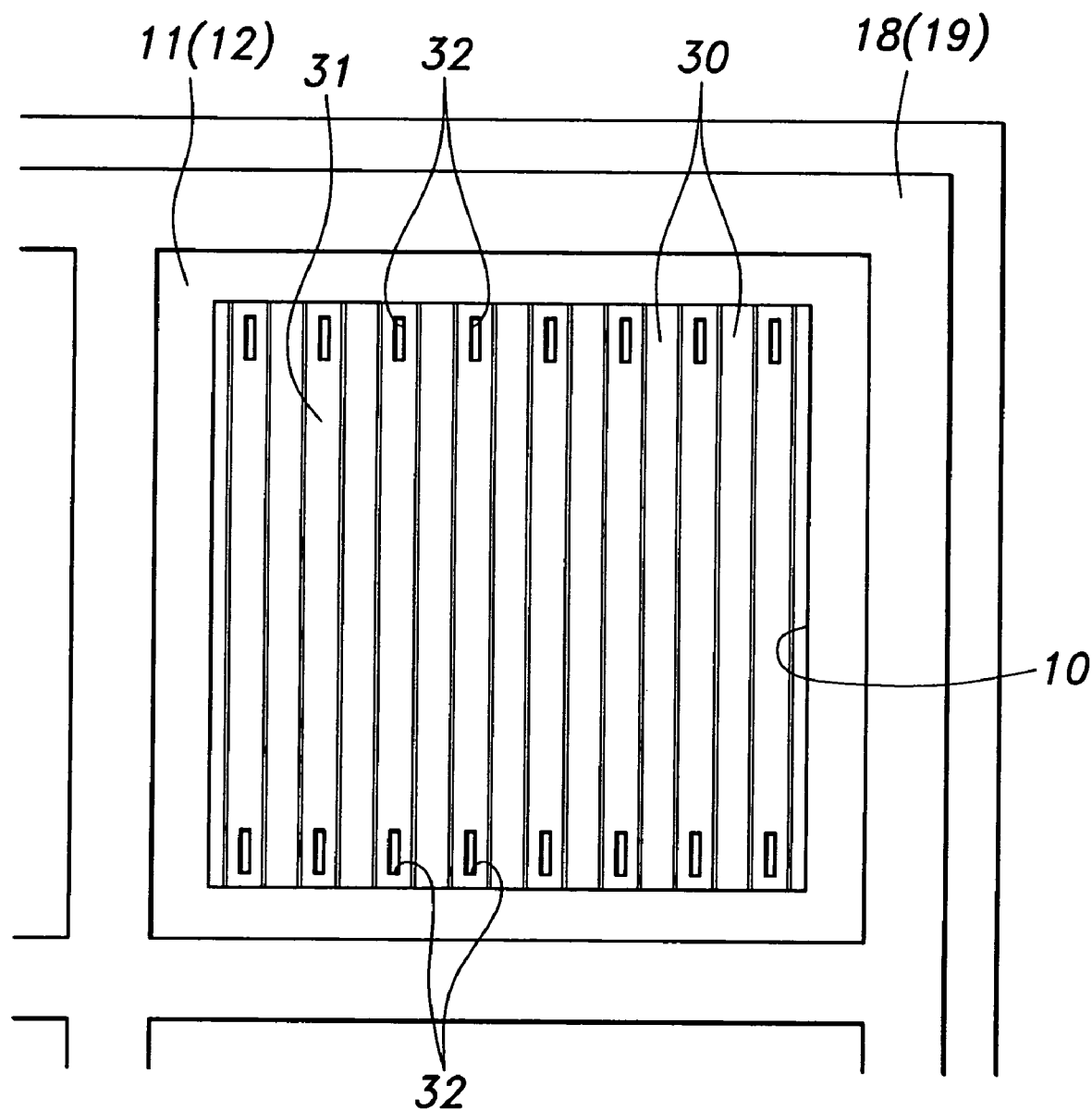
FIG. 3 is a partial plan view for showing a fluid passage of the separator of FIG. 1.
Figure 4:
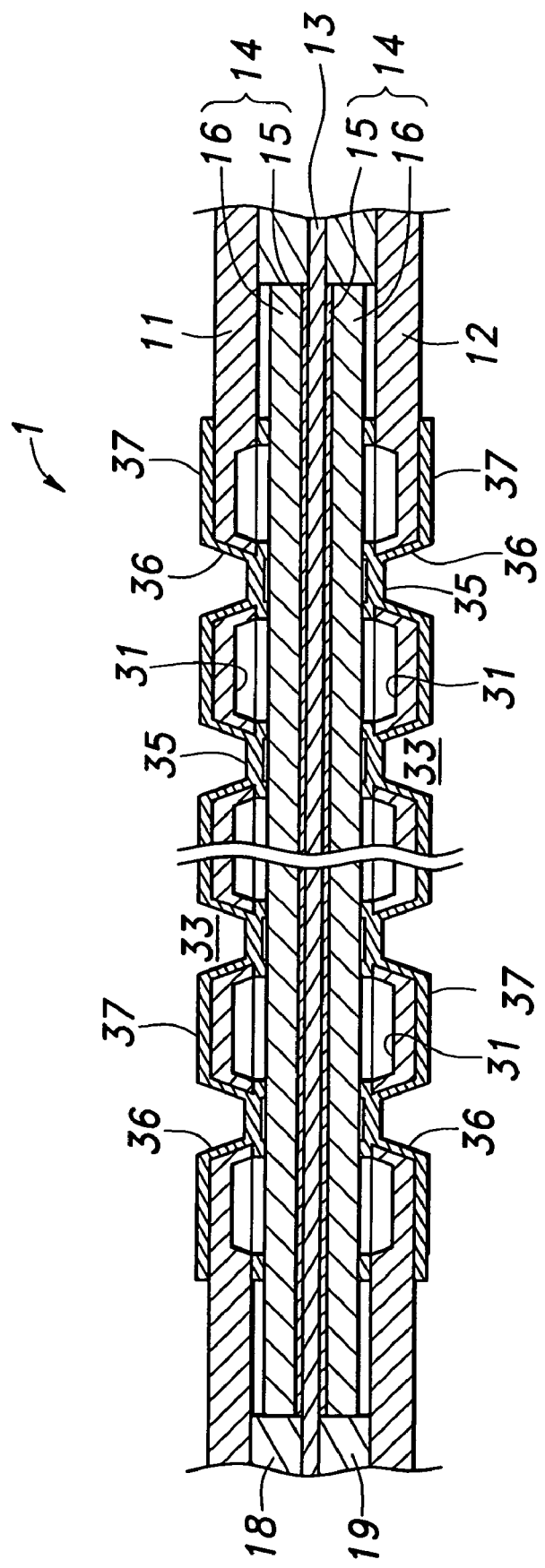
FIG. 4 is a cross-sectional view of a single cell of the fuel cell assembly of FIG. 1 in an assembled state.

FIG. 2 is a partly broken enlarged perspective view for showing the separator 11 (12) in detail, FIG. 3 is a partial plan view for showing one of the recesses 10 of the separator 11 (12), and FIG. 4 is a cross-sectional view showing the single cell of the fuel cell assembly 1 in an assembled state before attaching the electroconductive plates 26 thereto. In FIGS. 2 and 3, the seal plate 18 (19) is also shown together with the separator 11 (12).

As shown in these drawings, in this embodiment, each rectangular recess (fluid passage) 10 of the separators 11, 12 comprises a plurality of parallel-extending protrusions 30, and the adjoining protrusions 30 define an elongated channel (or lane) 31 therebetween so that the fuel fluid or oxidizing fluid can flow through the channels 31. In order to allow entrance and discharge of the fuel fluid or oxidizing fluid to and from the channels 31, a pair of openings (fluid ports) 32 are formed at either end portion of each channel 31. The depth of each channel 31 (or the height of each protrusion 30) can be 200 mm and the width of the same may be 1 mm, for example. The separators 11, 12 formed with the recess 10 each comprising a plurality of channels 31 can be preferably formed by processing a substrate consisting of an inorganic material such as silicon or glass by means of etching, etc.

As shown in FIGS. 2 and 4, according to the present invention, each protrusion 30 in the recesses 10 of the separators 11, 12 is formed with a through-hole(s) 33 extending from the first surface to the second surface of the separators 11, 12, and an opening of each through-hole 33 on the side of the first surface is covered with a first electroconductive film 35 so that the electroconductive film 35 constitutes the top surface of the protrusion 30. Each protrusion 30 may be formed with a single through-hole 33 extending along the protrusion 30 or may be formed with a plurality of through-holes 33. A side wall of each through-hole 33 is coated with a second electroconductive film 36, and the second surface of the separators 11, 12 is coated with a plurality of third electroconductive films 37 corresponding to the fuel cells 25a-25d. In this way, the first electroconductive film 35 on top of each protrusion 30 is connected to the associated third electroconductive film 37 on the second surface of the separator 11 (12) via the second electroconductive film 36 on the side wall of the associated through-hole 33. As seen in the cross-sectional view of FIG. 4, in the assembled state of the fuel cell assembly 1, the first electroconductive film 35 on top of each protrusion 30 contacts with the associated diffusion electrode 14. Thus, the catalyst electrode layer 15 of each diffusion electrode 14 is electrically connected to the first electroconductive film 35 via the diffusion layer 16. Accordingly, each catalyst electrode layer 15 is connected to the associated third electroconductive film 37 on the second (outer) surface of the separator 11 (12) via the associated first and second electroconductive films 35, 36. In such a configuration, by connecting the third electroconductive films 37, which are provided on the second surface of the separator 11 (12) so as to correspond to the fuel cells 25a-25d, with appropriate electroconductive plates 26, it is possible to readily connect the fuel cells 25a-25d in a desired pattern, as explained below.

Figure 5A:
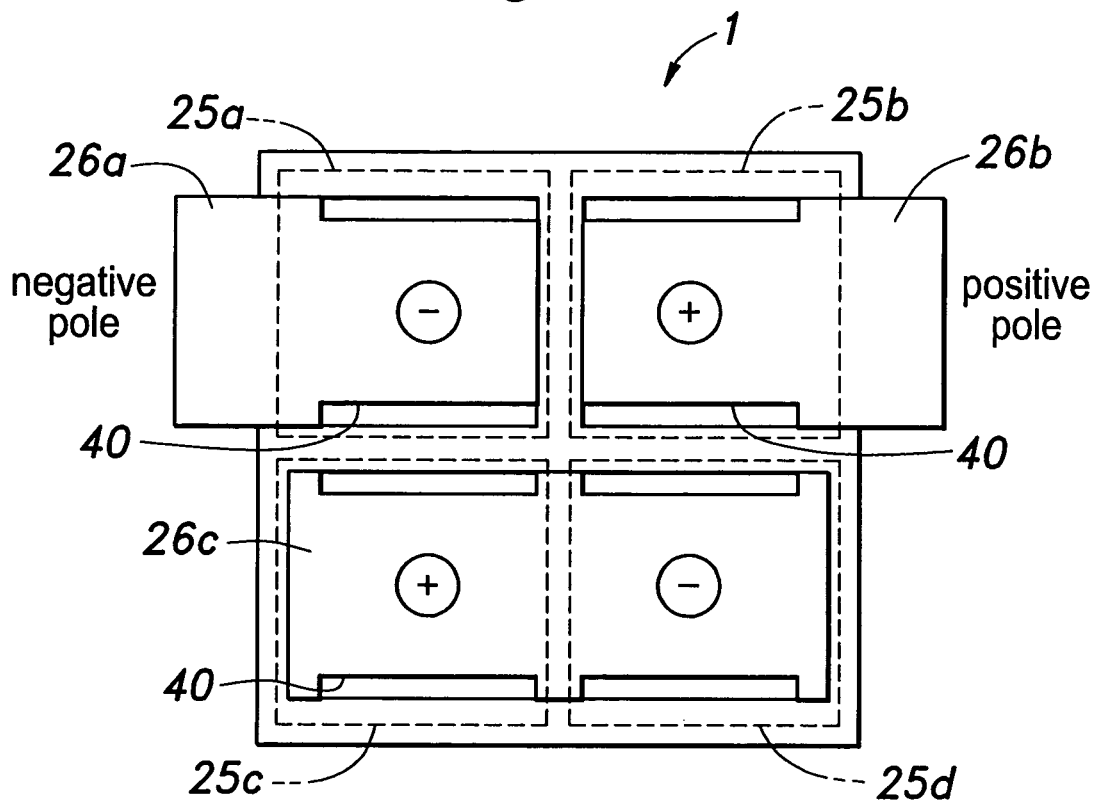
FIGS. 5a and 5b are plan views for showing an example of fuel cell connection in the fuel cell assembly of FIG. 1.
Figure 5B:
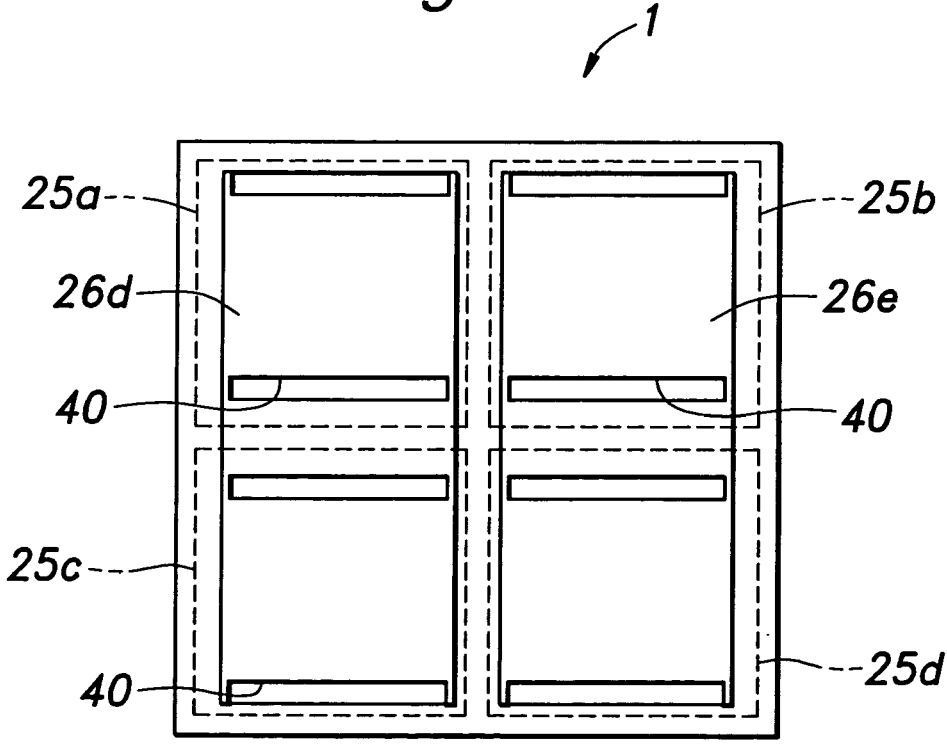

FIGS. 5a and 5b are schematic views for showing an exemplary connection pattern of the fuel cells 25a-25d that can be achieved by using the electroconductive plates 26. In this example, the electroconductive plates 26 comprise three electroconductive plates 26a-26c on top of the fuel cell assembly 1 and two electroconductive plates 26d, 26e on the underside of the same. FIG. 5a shows the arrangement of the electroconductive plates 26a-26c on top of the fuel cell assembly 1 while FIG. 5b shows the arrangement of the electroconductive plates 26d, 26e on the underside of the same, both arrangements being seen from above the fuel cell assembly 1. In this example, diagonally arranged pair of cells of the four fuel cells 25a-25d have the same polarity such that adjoining cells in the left-right or up-down direction of the drawing have opposite polarities (as shown by symbols in FIG. 5a, in the upper left and lower right fuel cells 25a, 25d, negative voltage appears on the top side thereof while in the upper right and lower left cells 25b, 25c, positive voltage appears on the top side thereof, for example).

In the example shown in FIGS. 5a and 5b, the lower left cell 25c and the lower right cell 25d are connected by the electroconductive plate 26c on the top side of the fuel cell assembly 1, while the upper left cell 25a and the lower left cell 25c as well as the upper right cell 25b and the lower right cell 25d are connected by the electroconductive plates 26d, 26e, respectively on the underside of the fuel cell assembly 1. Thus, between the electroconductive plate 26a connected to the upper left cell 25a and the electroconductive plate 26b connected to the upper right cell 25b, the four cells 25a-26d are connected in series in the order of 25a→25c→25d→25b. It should be noted that each of the electroconductive plates 26a-26e is formed with openings or cutouts 40 to expose the openings 32 formed in the bottom of each recess 10 to serve as the fluid inlet/outlet ports, to thereby allow the openings 32 to be connected to a fuel/oxidizing fluid source (not shown) or fluid exhaust (not shown).

Figure 6A:
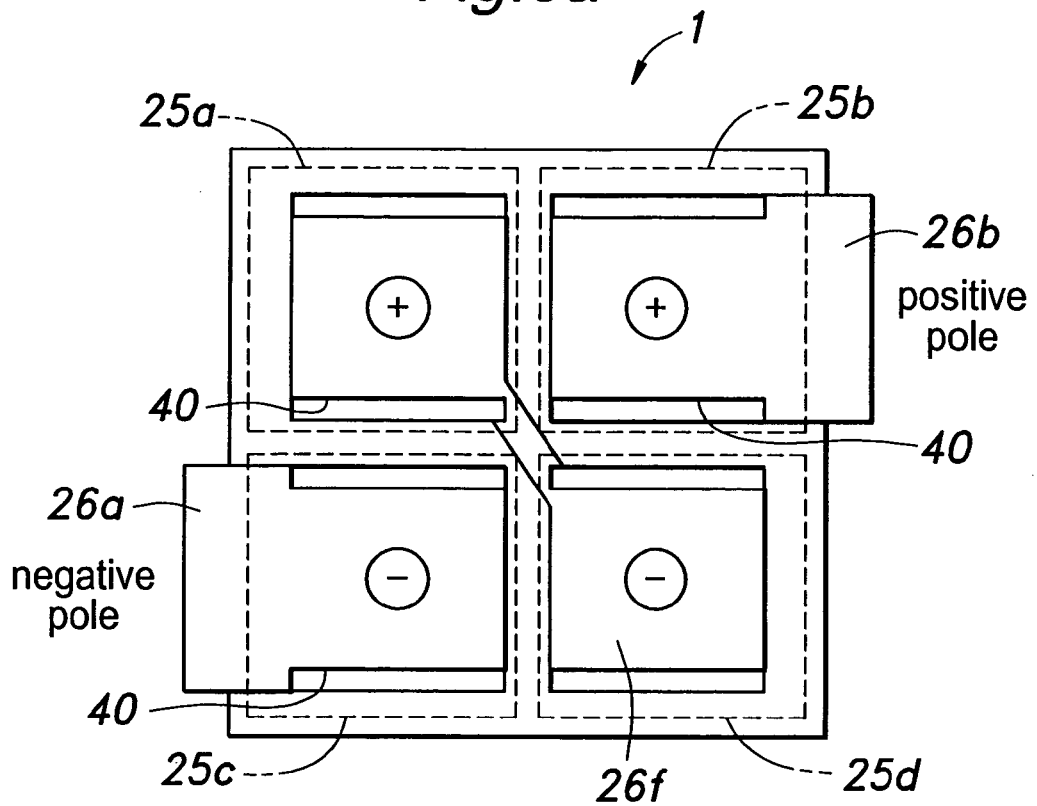
FIGS. 6a and 6b are plan views for showing another example of fuel cell connection in the fuel cell assembly of FIG. 1.
Figure 6B:
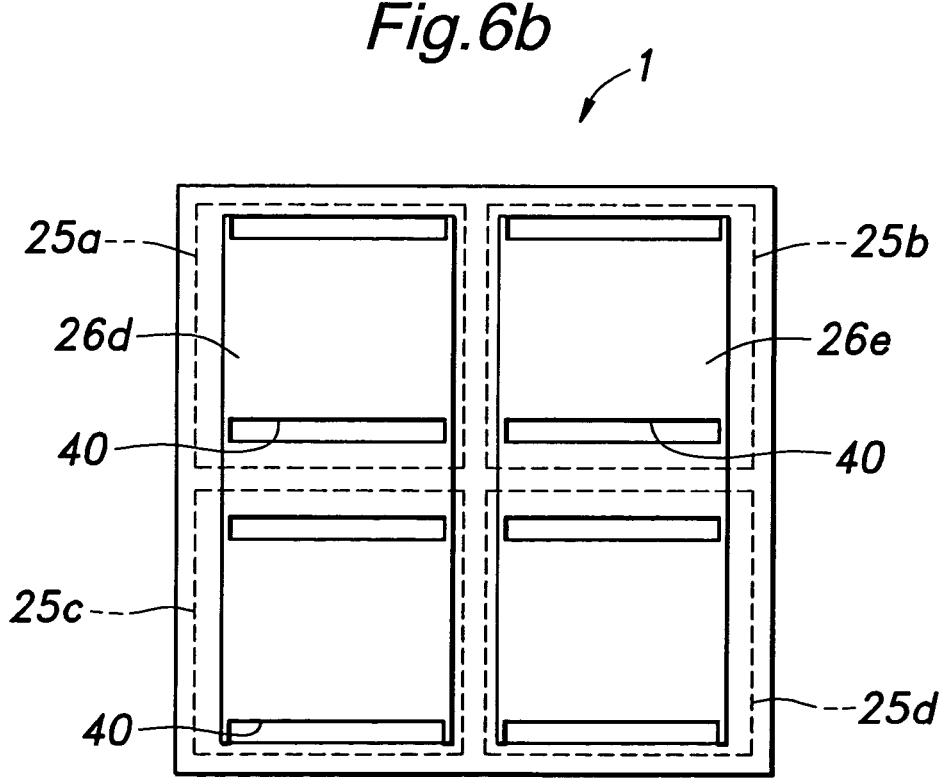

FIGS. 6a and 6b are schematic views similar to FIGS. 5a and 5b and show another example of connection pattern of the fuel cells 25a-25d that can be achieved by using the electroconductive plates 26. In FIGS. 6a and 6b, component parts similar to those in FIGS. 5a and 5b are denoted with the same numerals and further explanation thereof is omitted. In this example, as shown in FIG. 6a, the fuel cells aligned in the left-right direction have the same polarity, and specifically, in the upper left cell 25a and the upper right cell 25b, positive voltage appears on the top side thereof while in the lower left cell 25c and lower right cell 25d, negative voltage appears on the top side thereof. As seen in FIG. 6a, on the top side of the fuel cell assembly 1, the upper left cell 25a and the lower right cell 25d are connected to each other by an electroconductive plate 26f, while on the underside of the fuel cell assembly 1, the up-down aligned fuel cells 25a, 25c are connected to each other by an electroconductive plate 26d and similarly the fuel cells 25b, 25d are connected to each other by an electroconductive plate 26e. In this way, between the electroconductive plate 26a attached to the lower left cell 25c on the top side and the electroconductive plate 26b attached to the upper right cell 25b on the top side, the four fuel cells 25a-25d are connected in series in the order of 25c→25a→25d→25b. Thus, when the four cells 25a-25d are connected in series, the cells positioned at the ends of the series connection can be selected arbitrarily.

Figure 7A:
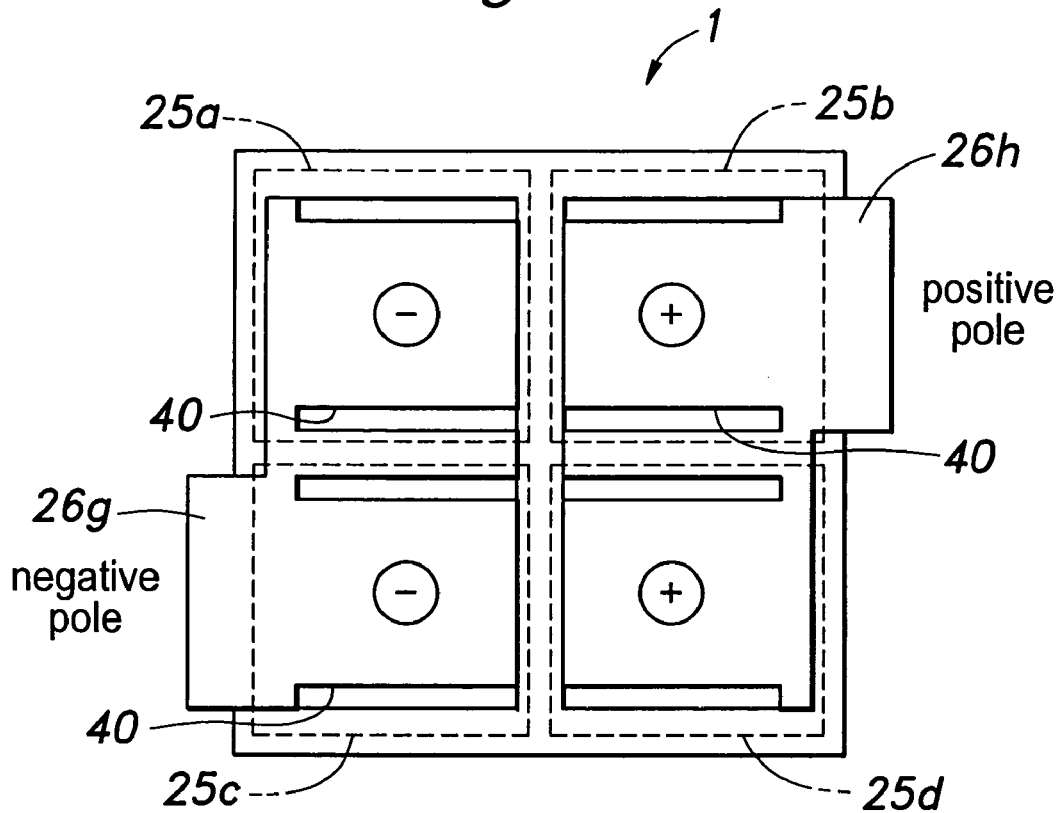
FIGS. 7a and 7b are plan views for showing yet another example of fuel cell connection in the fuel cell assembly of FIG. 1.
Figure 7B:
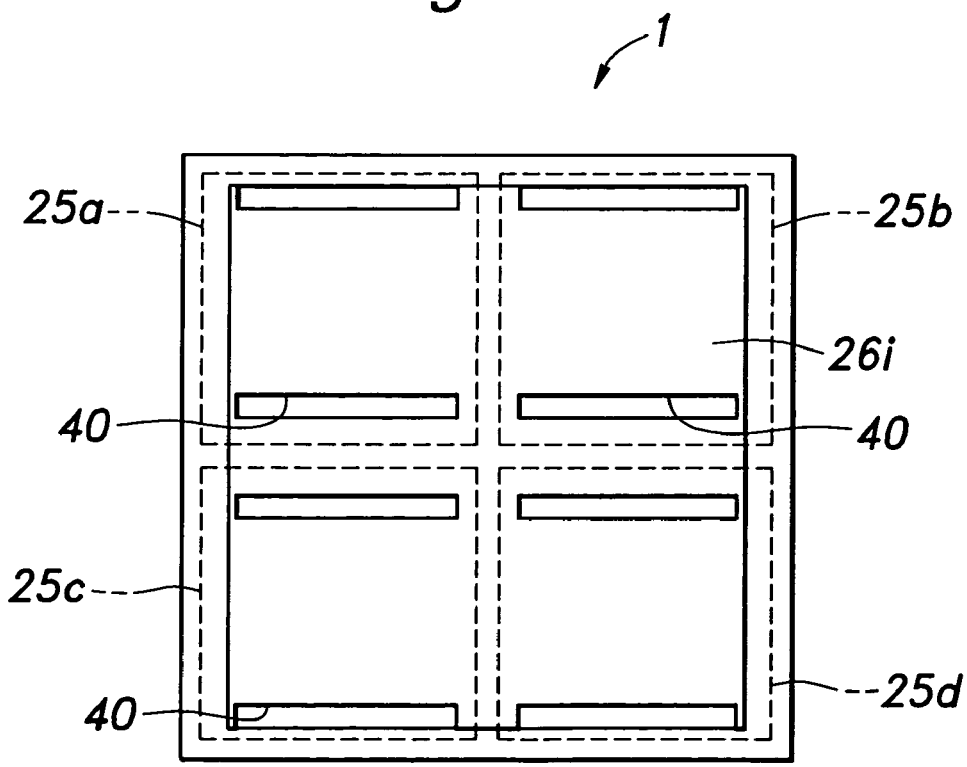

FIGS. 7a and 7b are schematic views similar to FIGS. 5a and 5b and show yet another example of connection pattern of the fuel cells 25a-25d that can be achieved by using the electroconductive plates 26. In FIGS. 7a and 7b, component parts similar to those in FIGS. 5a and 5b are denoted with the same numerals and further explanation thereof is omitted. In this example, as indicated by symbols in FIG. 7a, the fuel cells aligned in the up-down direction have the same polarity, and specifically, in the upper left cell 25a and the lower left cell 25c, negative voltage appears on the top side thereof while in the upper right cell 25b and lower right cell 25d, positive voltage appears on the top side thereof. On the top side of the fuel cell assembly 1, the cells of the same polarity (i.e., the cells 25a, 25c and the cells 25b, 25d) are connected to each other by electroconductive plates 26g, 26h as shown in FIG. 7a, while on the underside of the fuel cell assembly 1, the four cells 25a-25d are all connected together by an electroconductive plate 26i. In this way, between the top side and the underside, two pairs of parallel-connected fuel cells are connected in series. As described above, by changing the polarity of the cells 25a-25d and the shape/arrangement of the electroconductive plates 26 (26a-26i), it is possible to achieve a desired connection pattern of the fuel cells.

Figure 8:
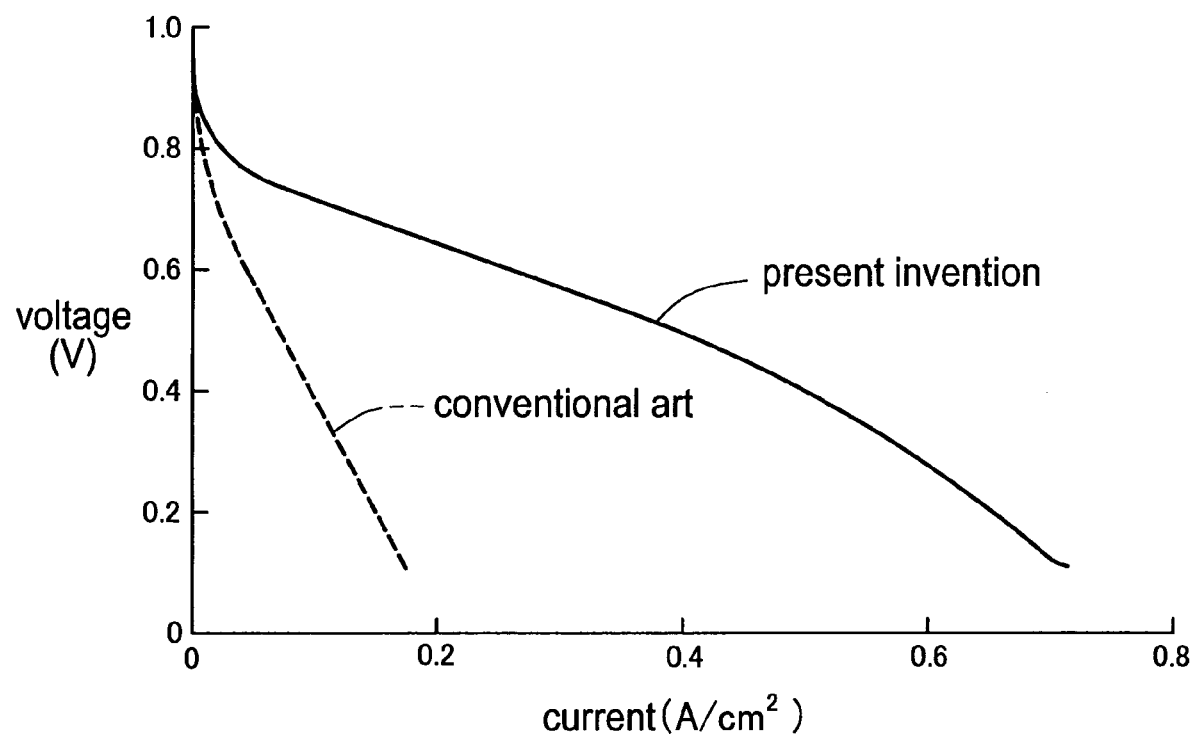
FIG. 8 is a graph showing the relationship between the electric current flowing through a load and the voltage applied to the load in the fuel cell assembly according to the present invention and in the conventional fuel cell assembly.
Figure 14:
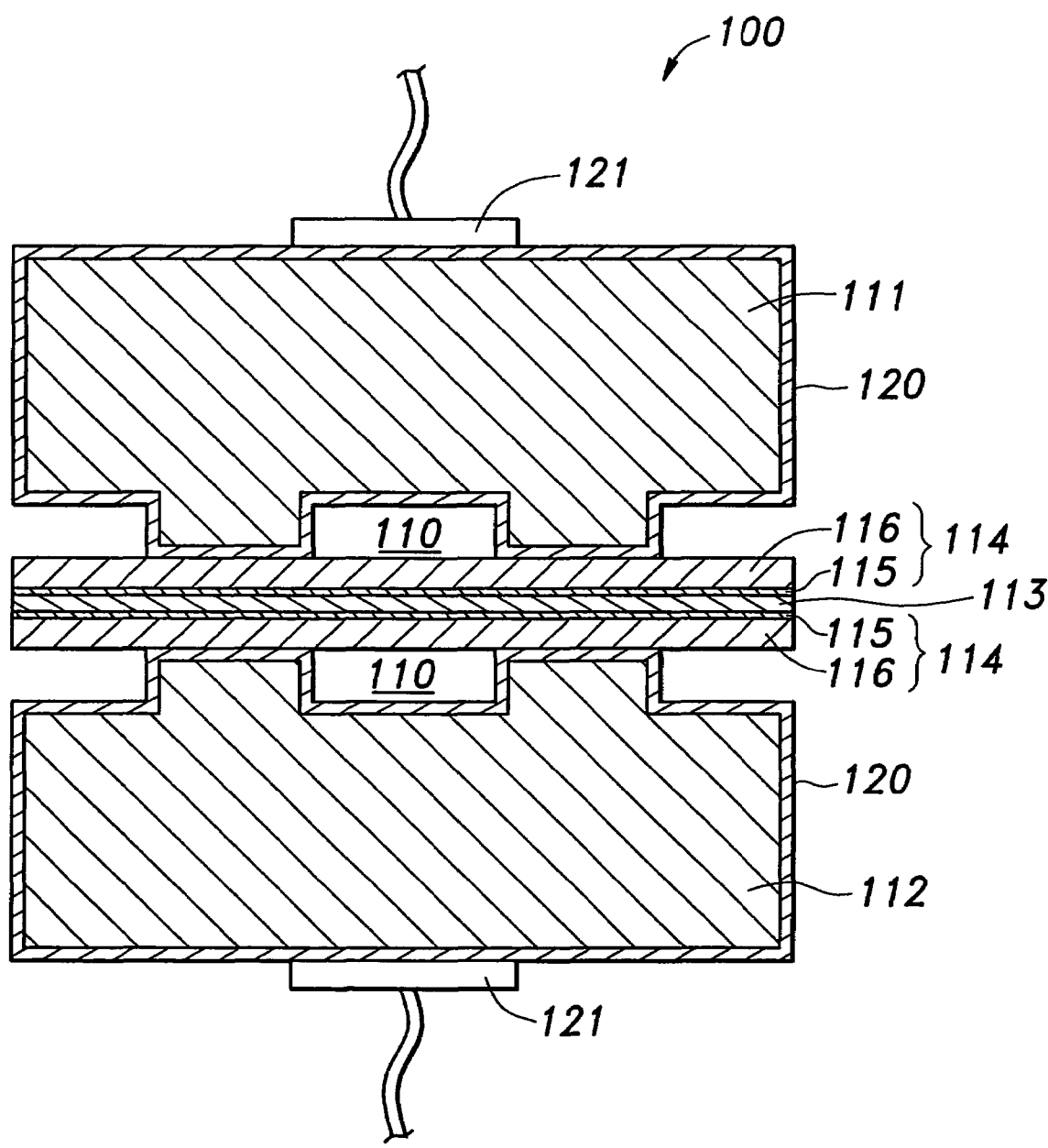
FIG. 14 is a schematic cross-sectional view for showing an embodiment of a conventional fuel cell assembly.

When in use, the present fuel cell assembly 1 shown above and the conventional fuel sell assembly 100 shown in FIG. 14 are connected to a load (not shown). FIG. 8 is a graph showing the relationship between the voltage applied to the load and an electric current (more specifically, current density) flowing therethrough as the load is varied, in which as many identical component parts as possible are used in both the fuel cell assemblies 1, 100, and adjustment is made so that the no-load (i.e., zero-current) output voltages of the fuel cell assemblies become substantially the same. As shown in the graph, for a larger load (or larger current), decrease in the voltage supplied to the load is smaller in the fuel cell assembly 1 of the present invention than in the conventional fuel cell assembly 100. This can be attributed to the difference that in the fuel cell assembly 100 of FIG. 14, the electroconductive film (or surface electrode) 120 coating the surface of the separators 111, 112 implements an electroconductive path connecting the first and second surfaces of each separator 111, 112, while in the fuel cell assembly 1, the first-third electroconductive films 35-37 form feedthrough electroconductive paths (or via-hole electrodes) extending through each separator 11, 12.

Now, with reference to FIGS. 9a-9e and FIGS. 10a-10e, a preferred process for manufacturing the separator 11 (12) of the fuel cell assembly 1 according to the present invention is described hereinafter. In these drawings, portions corresponding to those of the above shown embodiment are denoted with the same numerals.

Figure 9A:
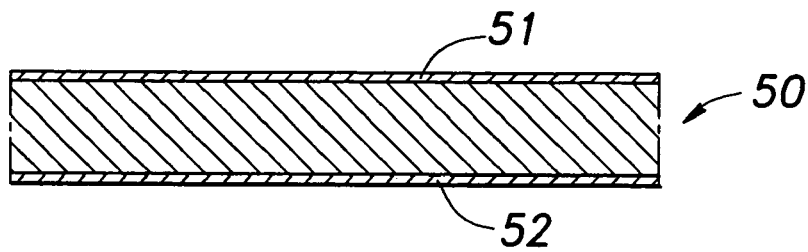
FIGS. 9a-9e and FIGS. 10a-10e are partial cross-sectional views for showing a preferred embodiment of a process for manufacturing a separator for a fuel cell assembly according to the present invention.

First, as shown in FIG. 9a, a substrate 50 consisting of single crystal silicon and having a thickness of about 400 μm, for instance, is washed by using sulfuric acid or the like, and then, silicon nitride films 51, 52 of about 0.5 μm thickness, for example, are formed on top and under surfaces of the substrate 50 by sputtering. The silicon nitride films 51, 52 can serve as insulating layers.

Figure 9B:
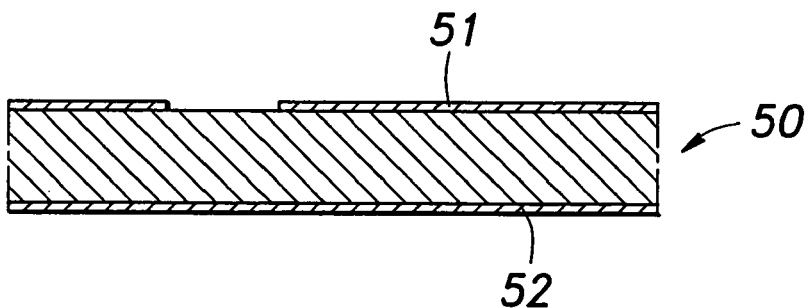
Figure 9C:
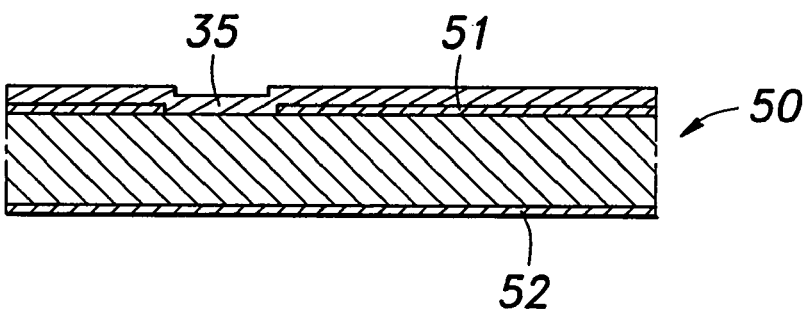

Subsequently, as shown in FIG. 9b, reactive ion etching (RIE) is conducted with a mask (not shown) to remove portions of the silicon nitride film 51 on the top surface of the substrate 50 at positions aligned with the through-holes 33 to be formed, and then, as shown in FIG. 9c, the first electroconductive film 35 of about 4 μm thickness is formed on top of the substrate 50 by physical vapor deposition (PVD) for example. The first electroconductive film 35 can preferably have a two-layered structure comprising a titanium (Ti) layer and a gold (Au) layer formed on the titanium layer. Titanium improves the contact between the silicon nitride and gold, and may be substituted by aluminum (Al), nickel (Ni) or chromium (Cr). Gold may be substituted by other electroconductive material such as nickel (Ni), copper (Cu), platinum (Pt), iron (Fe), tungsten (W), molybdenum (Mo), doped silicon or polysilicon. Also, film forming processes other than the physical vapor deposition, such as chemical vapor deposition (CVD), spin coating, sputtering or screen printing may be used.

Figure 9D:
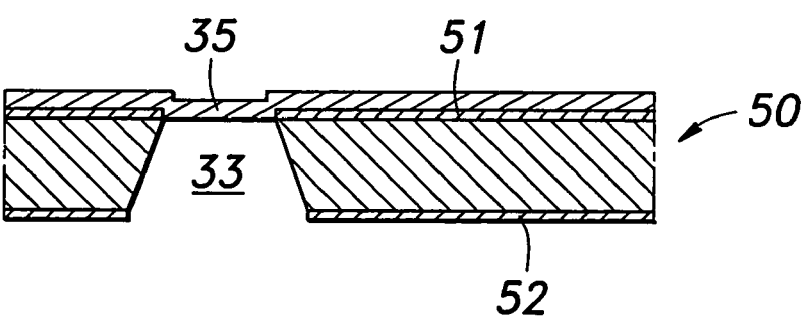

In the next step, as shown in FIG. 9d, etching is conducted with a mask (not shown) to remove portions of the silicon nitride film 52 on the underside of the substrate 50 aligned with the through-holes 33 to be formed, followed by wet etching using an alkali solution such as KOH solution to form the through-holes 33 in the silicon substrate 50 so that the through-holes 33 reach the first electroconductive film 35 on the top side of the silicon substrate 50. Since this process is anisotropic etching, the side wall of each through-hole 33 inclines at an angle reflecting the crystal orientation of the silicon whereby the cross-section of each through-hole 33 diverges from the top to under surface of the substrate 50 (or from the first to second surface of the separator 11 (12)).

Figure 9E:
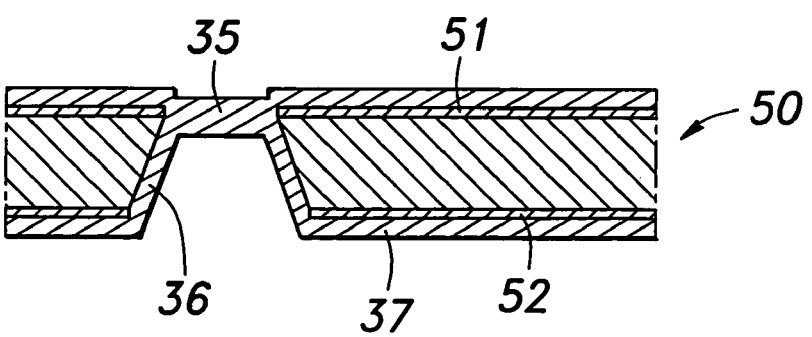

Thereafter, as shown in FIG. 9e, metallic material such as Ti and Au is deposited from under the substrate 50 to thereby form the second and third electroconductive films 36, 37 on the side wall of each through-hole 33 and on the under surface of the substrate 50, respectively. In this step, the metallic material is also deposited on the underside of the first electroconductive film 35 covering the upper opening of each through-hole 33, thus increasing the thickness of the first electroconductive film 35. It should be noted that since the side wall of each through-hole 33 is inclined as mentioned above, the deposition of the metallic material thereon is facilitated so that the sufficiently thick and uniform second electroconductive film 36 can be preferably achieved. It should be also noted that in the step shown in FIG. 9d, dry etching or other process may be used instead of wet etching to form the through-holes 33 having a vertical side wall. In such a case, however, forming the second electroconductive film 36 uniformly on the side wall could become more difficult than in the case where the through-holes 33 are formed by wet etching.

Figure 10A:
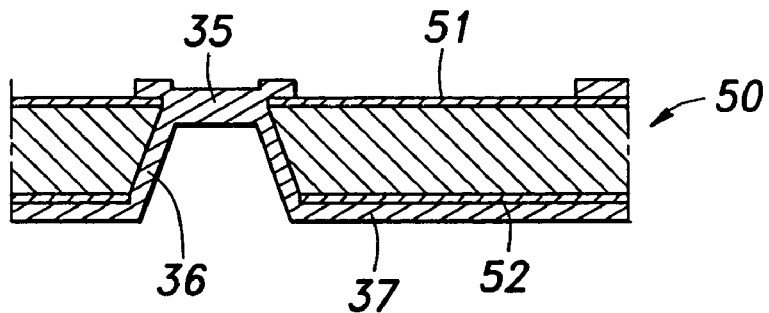
Figure 10B:
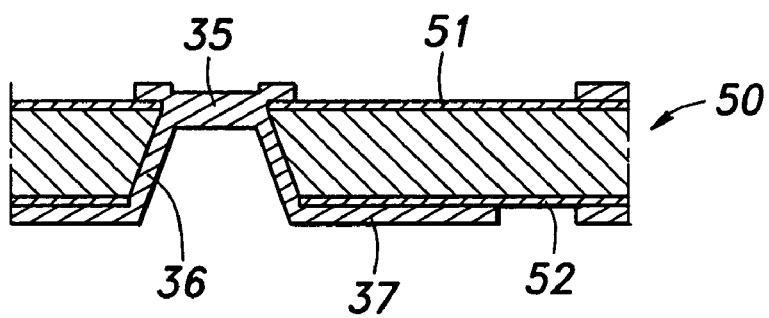

In the step shown in FIG. 10a, etching is performed on the top surface of the substrate 50 with a mask (not shown) to remove portions of the first electroconductive film 35 aligned with the channels (lanes) 31 to be formed while leaving the portions of the electroconductive film 35 that will constitute the top of the protrusions 30 in the recess 10. Similarly, in the step of FIG. 10b, etching is performed on the under surface of the substrate 50 with a mask (not shown) to remove portions of the third electroconductive film 37 where the fluid ports 32 are to be formed.

Figure 10C:
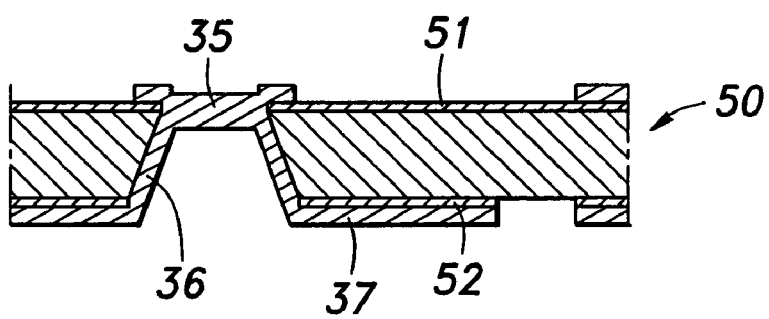
Figure 10D:
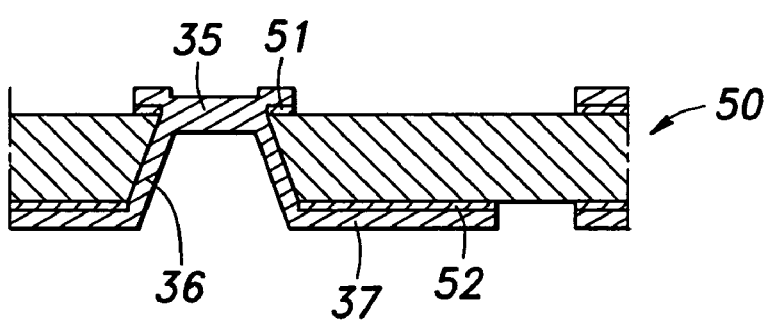

Then, in the step of FIG. 10c, reactive ion etching is performed on the underside of the substrate 50 with a mask (not shown) to remove portions of the silicon nitride film 52 where the fluid ports 32 are to be formed. Also, as shown in FIG. 10d, reactive ion etching is performed on the top side of the substrate 50 with a mask (not shown) to remove portions of the silicon nitride film 51 where the channels 31 are to be formed.

Figure 10E:
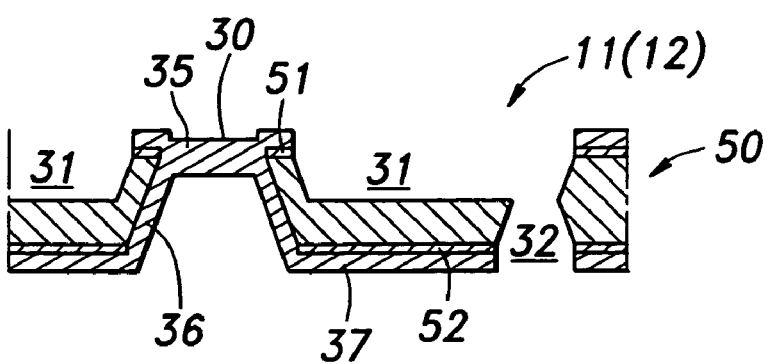

Finally, as shown in FIG. 10e, wet etching is carried out by using KOH solution so that the exposed silicon is etched from both the top side and the underside of the substrate 50 to whereby form the protrusions 30, channels 31 and fluid ports 32, and thus complete the separator 11 (12).

As described above, according to the present invention, in such a case that the separator 11 (12) is formed by using a semiconductor process or micromachine process comprising the etching of the substrate 50 consisting of an inorganic material such as silicon, the electroconductive path connecting the first surface (the top surface in FIGS. 9a-10e) and the second surface (the under surface in FIGS. 9a-10e) of the separator 11 (12) can be implemented by the second electroconductive film 36 coating the side wall of each through-hole 33 extending through the separator 11 (12) such that the first electroconductive film 35 constituting the top of the protrusions 30 is connected to the third electroconductive film 37 formed on the second surface of the separator 11 (12). As explained above, because the first-third electroconductive films 35-37 can be formed by using a semiconductor process or micromachine process such as vapor deposition, there is no need for carrying out insert molding, and the separator 11 (12) having such an electroconductive path can be formed with high precision and efficiency.

Figure 11A:
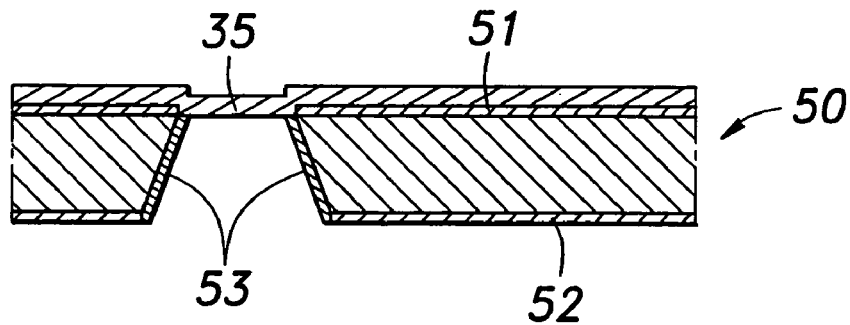
FIGS. 11a and 11b are partial cross-sectional views for showing another preferred embodiment of a process for manufacturing a separator for a fuel cell assembly according to the present invention.
Figure 11B:
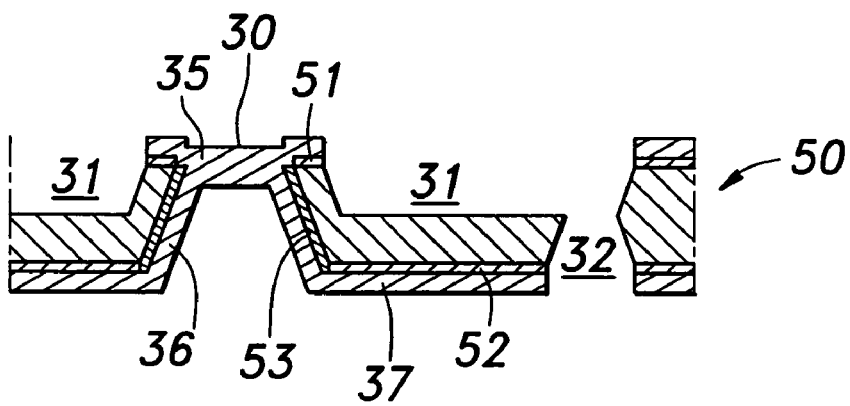

When the separator 11 (12) consists of a semiconductor material such as silicon, the insulation provided by such a separator sometimes is insufficient to achieve required performance of the fuel cell assembly. In such a case, it is preferable that the side wall of the through-holes 33 is coated with an insulating film so that the second electroconductive film 36 is formed on the insulating film. Specifically, between the steps shown in FIGS. 9d and 9e, the through-hole 33 may be preferably coated with a silicon nitride film 53 as shown in FIG. 1a. Instead of the silicon nitride, silicon oxide or metal oxide may be used. As a coating method, vapor deposition processes such as physical vapor deposition (PVD) or chemical vapor deposition (CVD), or wet processes such as spin coating may be used. Other steps can be performed in the same fashion as explained with respect to FIGS. 9a-10e. FIG. 11b is a partial cross-sectional view similar to that shown in FIG. 10e and shows the separator 11 (12) manufactured by the process containing the step of FIG. 11a.

Figure 13:
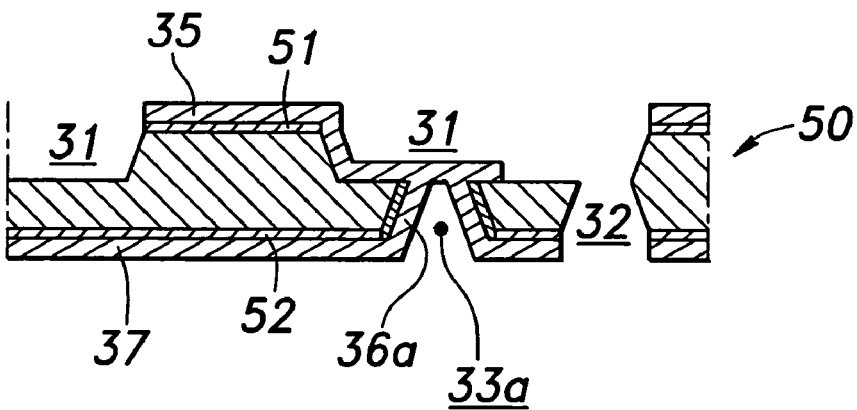
FIG. 13 is a partial cross-sectional view for showing another embodiment of a separator for a fuel cell assembly according the present invention.
Figure 12A:
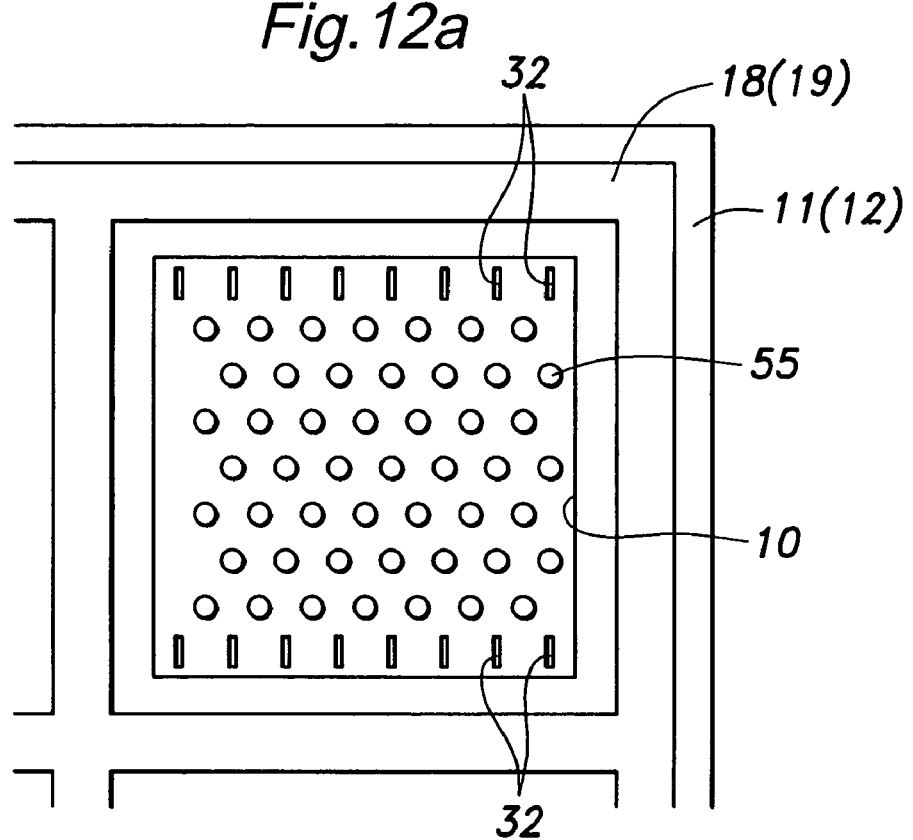
FIGS. 12a and 12b are partial plan views similar to FIG. 3 and show different embodiments of the fluid passage defined by the separator of the fuel cell assembly according to the present invention.
Figure 12B:
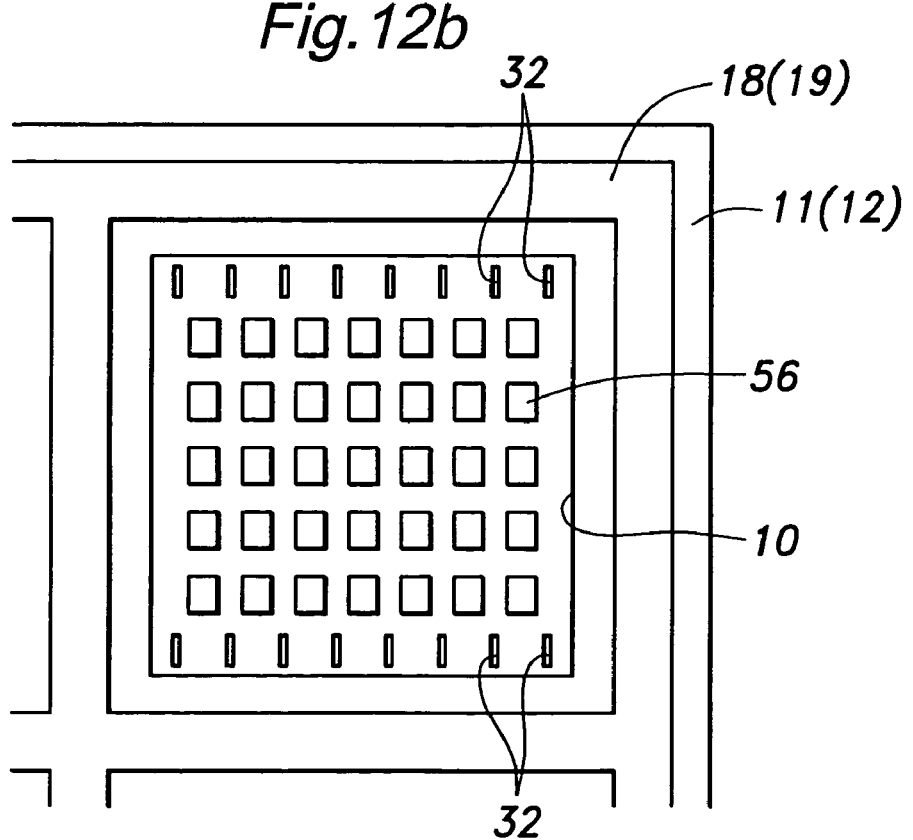

Although the present invention has been described in terms of a preferred embodiment thereof, it is obvious to a person skilled in the art that various alterations and modifications are possible without departing from the scope of the present invention which is set forth in the appended claims. For example, though in the above embodiment, each recess 10 has a plurality of protrusions 30 and channels 31 defined between adjacent protrusions 30, it may have different structure. As shown in plan views of FIGS. 12a and 12b, for example, each recess 10 may comprise a plurality of pillars 55 with a circular cross-section of about 0.5 mm diameter or a plurality of pillars 56 with a square cross-section having each side of about 0.7 mm in which each pillar 55, 56 is formed with an electroconductive path (not shown) of about 0.1 mm diameter extending therethrough. Thus, the projections in each recess 10 may assume various shapes. Also, though in the above embodiment, the through-holes 33 extending through the substrate 50 (or separator 11, 12) are formed in the protrusions 30, it is possible, as shown in FIG. 13, to form through-holes 33a in the channels 31 (or bottom of the recesses 10) and make the first electroconductive films 35 extend to the through-holes 33a in the bottom of the channels 31 so that the first electroconductive films 35 connect to associated second electroconductive films 36a formed on the side wall of the through-holes 33a. In such an embodiment, the protrusions 30 may not be formed with through-holes and thus the first electroconductive film 35 on top of each protrusion can be substantially flat. This favorably increases the area of the first electroconductive film 35 contacting the diffusion electrode 14. Further, instead of the electroconductive plates 26 (26a-26i) used for achieving electric connection among the fuel cells 25a-25d in the above embodiment, electroconductive films additionally formed on the outer surfaces of the separators 11, 12 may be used.

INDUSTRIAL APPLICABILITY

As described above, according to the present invention, the electroconductive path for connecting the two sides of each separator 11, 12 formed with the recesses 10 serving as passages for fuel fluid or oxidizing fluid is implemented by the second electroconductive film 36 formed on the side wall of each through-hole 33 extending through the separator 11, 12 to connect the first electroconductive film 35 constituting the top of each protrusion 30 in the recesses 10 to the third electroconductive film 37 formed on the surface of the separator 11, 12 opposite to that defining the recesses 10. Thus, even when the separators 11, 12 are formed by a semiconductor or micromachine process such as etching, it is possible to readily implement the electroconductive path passing through each separator by forming the first-third electroconductive films 35-37 by means of vapor deposition or the like, to thereby achieve a compact fuel cell assembly that comprises a pair of separators each having one or more electroconductive paths extending therethrough. In the case that the separators 11, 12 each define a plurality of recesses 10 to thereby define a plurality of fuel cells, a desired connection, such as series connection or parallel connection, of the fuel cells can be readily achieved and/or modified by using connection members 26 for connecting the third electroconductive films 37 each corresponding to respective fuel cells.

The invention claimed is:

1. A fuel cell assembly, comprising: an electrolyte layer (13); a pair of catalyst electrode layers (15) interposing said electrolyte layer there between; and a pair of planar separators (11, 12) interposing said electrolyte layer and said catalyst electrode layers there between, wherein each said separator of said pair of separators comprises a first surface facing said electrolyte layer and a second surface opposite to said first surface, wherein said first surface comprises at least one recess (31) through which a fuel fluid or an oxidizer fluid flows so as to contact an associated one of said pair of catalyst electrode layers, wherein said separator further comprises at least one through hole (33) that extends from said first surface to said second surface of each said separator; a first electroconductive film (35) disposed across said at least one through hole, wherein said first electroconductive film electrically communicates with said catalyst electrode layer; a second electroconductive film (36) disposed on the walls of said at least one through hole; and a third electroconductive film (37) disposed on said second surface of each said separator, wherein said second electroconductive film electrically connects said first electroconductive film and said third electroconductive film to provide electrical continuity through said planar separator.

2. A fuel cell assembly according to claim 1, wherein at least one protrusion (30, 55, 56) is provided in said recess (31) of each of said pair of separators (11, 12) and wherein said first electroconductive film (35) constitutes at least part of a top surface of said protrusion.

3. A fuel cell assembly according to claim 1, wherein each separator (11, 12) is provided with a plurality of said recesses (31) so that a plurality of fuel cells are arranged on a common plane, and a plurality of said third electroconductive films (37) corresponding to said plurality of fuel cells are formed on said second surface of each separator, and wherein said fuel cell assembly further comprises one or more electrical connection members for contacting said third electroconductive films on said second surface of said pair of separators to thereby electrically connect said plurality of fuel cells.

4. A fuel cell assembly according to claim 2, wherein said through-hole (33) is formed in said protrusion (30, 55, 56).

5. A fuel cell assembly according to claim 1, wherein said through-hole (33) is provided in a bottom of said recess (31), and wherein at least part of said first electroconductive film (35) extends along said bottom of said recess to contact said second electroconductive film (36) formed on said side wall of said through-hole provided in said bottom of said recess.

6. A fuel cell assembly according to claim 1, further comprising an electroconductive diffusion layer between each of said separators (11, 12) and said associated catalyst electrode layer (15).

7. A fuel cell assembly according to claim 1, wherein etched features are provided in each of said pair of separators.

8. A fuel cell assembly according to claim 7, wherein said first to third electroconductive films (35, 36, 37) comprise a deposited metallic material disposed on said pair of separators, wherein said deposition is by either of physical vapor deposition (PVD), chemical vapor deposition (CVD), spin coating, sputtering or screen printing.

9. A fuel cell assembly according to claim 8, wherein said side wall of each through-hole (33) of said pair of separators (11, 12) is inclined so that each through-hole diverges from said first surface to said second surface of said pair of separators.

10. A fuel cell assembly according to claim 7, wherein said substrate is made of a semiconductor material, and an insulating layer is formed between said first electroconductive film (35) and said first surface of each separator (11, 12), between said second electroconductive film (36) and said side wall of said through-hole (33), and between said third electroconductive film (37) and said second surface of each separator.

* * * * *